| | FLIP - FLOP | | |
|---|---|---|---|
| | 3 | 2 | 1 |
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

TABLE 1

INVENTOR.
JAMES T. WHALEN

BY Russell A. Cannon
AGENT

INVENTOR.
JAMES T. WHALEN
BY Russell A Cannon
AGENT

Dec. 22, 1970 J. T. WHALEN 3,550,017

PHASE LOCKED PULSE TRAIN EXTRACTOR SYSTEM

Filed Sept. 30, 1968 4 Sheets-Sheet 3

INVENTOR.
JAMES T. WHALEN

BY Russell A. Cannon

AGENT

INVENTOR.
JAMES T. WHALEN
BY Russell A Connor
AGENT

United States Patent Office 3,550,017

Patented Dec. 22, 1970

3,550,017

PHASE LOCKED PULSE TRAIN EXTRACTOR SYSTEM

James T. Whalen, San Jose, Calif., assignor to Sylvania Electric Products Inc., a corporation of Delaware Filed Sept. 30, 1968, Ser. No. 763,674
Int. Cl. H03k 5/18
U.S. Cl. 328—110 11 Claims

ABSTRACT OF THE DISCLOSURE

This system includes a resettable clock generator which controls the rate at which input pulses are clocked through a shift register. The input signal and the output of the register are combined in an AND gate which produces an output pulse when pulses are simultaneously present at the inputs thereof. The output pulse is applied to and resets the clock generator to extend for a fixed time period from generation of the output pulse, the generation of the next clock pulse and thus to phase lock the system.

BACKGROUND OF INVENTION

This invention relates to pulse extractors and more particularly to a phase locked system for extracting pulses of an input pulse train. The term extracting a pulse from an input pulse train is defined as producing an output pulse when a plurality of input pulses satisfying specified criteria are received by the system.

A prior art system for extracting a train of pulses from a received signal includes a shift register that is responsive to the output of a variable frequency clock generator for advancing received pulses through the register. The received signals and the output of the register are logically combined in an AND gate. When an input pulse train has a pulse repetition frequency (PRF) equal to the frequency $f_c/n$ (where $f_c$ is the clock frequency and $n$ is the number of stages in the shift register) such that pulses are simultaneously present at the input to and the output of the register, the AND gate produces a train of pulses having a PRF equal to that of the input. This prior art system has the disadvantage that when the input PRF is only approximately equal to the frequency $f_c/n$ extraction of input pulses is intermittent and falls off rapidly to zero extraction as the PRF is varied from the frequency $f_c/n$, as illustrated in FIG. 1. By logically combining the input with the contents of a number of stages of a pair of shift registers connected in series, the extraction gate is increased so that the range of PRF's over which 100% extraction occurs is extended. The term extraction gate means the time when a pulse from an input pulse train of interest is assumed to occur. The sensitivity of this system, however, is inversely proportional to the width of the extraction gate and is caused to decrease.

An object of this invention is the provision of a pulse train extractor providing continuous extraction over an extended range of input PRF's while maintaining constant the width of the extraction gate and the sensitivity of the system.

SUMMARY OF INVENTION

In accordance with this invention, input pulses are applied directly and through a digital delay line to a logic circuit. The pulses are advanced through the delay line by clock pulses from a resettable clock generator. The logic circuit produces an output pulse which is applied to and resets the clock when pulses are simultaneously present at the input and the output of the delay line. Reset of the clock extends for a fixed time interval from generation of the output pulse, the generation of the next clock pulse and phase locks the system.

DESCRIPTION OF PREFERRED EMBODIMENT

Figure 1:
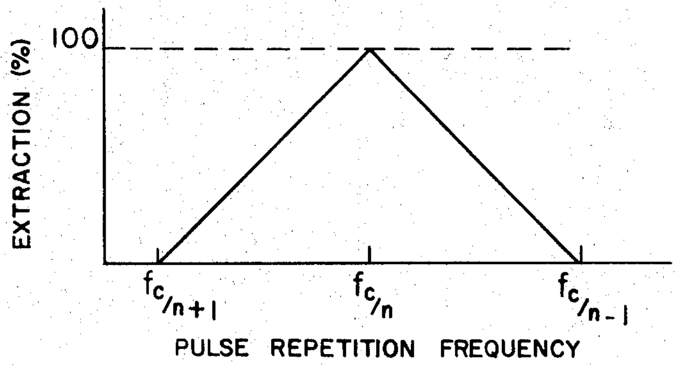
FIG. 1 is a curve illustrating extraction of input pulses as a function of the PRF of input pulses for a prior art system.
Figure 2:
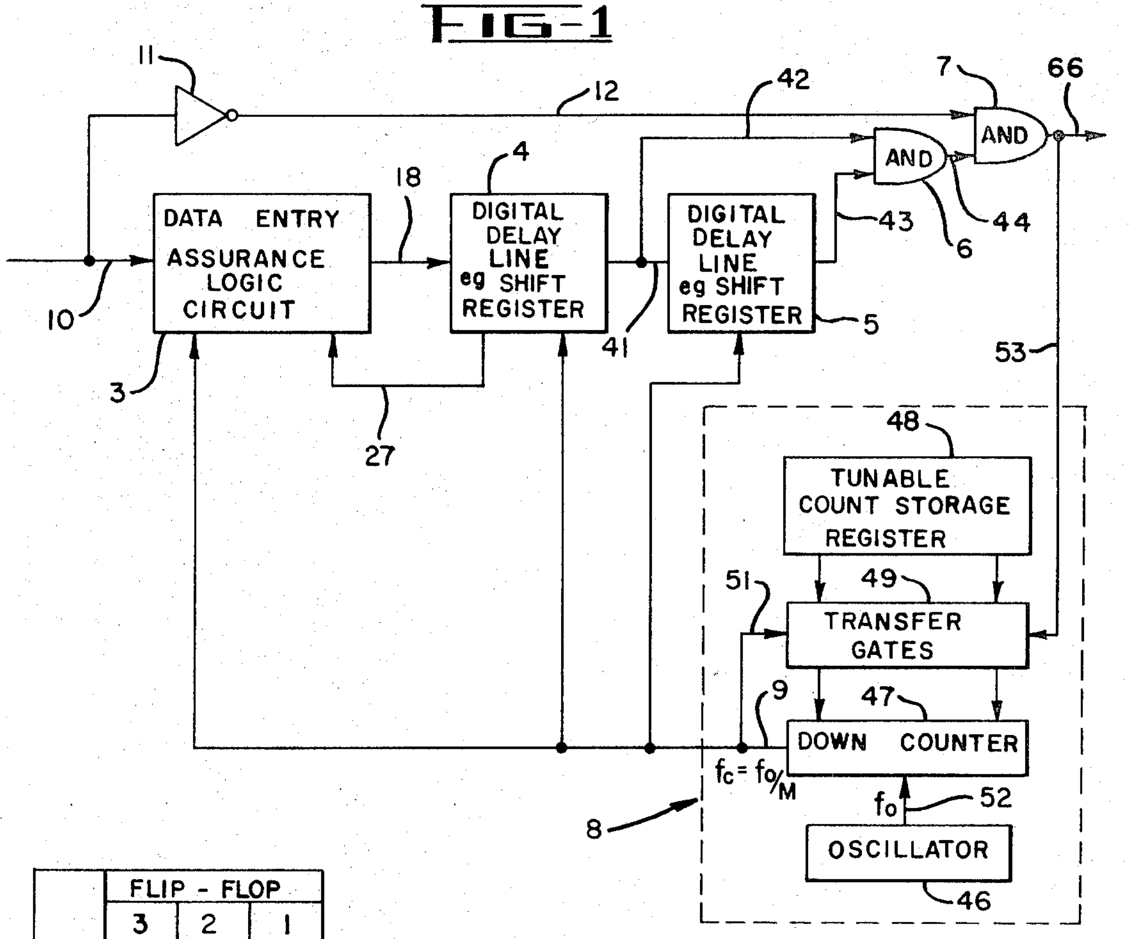
FIG. 2 is a block diagram of a system embodying this invention.

Referring now to FIG. 2, the system comprises data entry assurance logic (DEAL) circuit 3, digital delay lines 4 and 5, AND gates 6 and 7, and resettable clock generator 8. The digital delay lines may, by way of example, be shift registers each having "$n$" stages. Clock pulses on line 9 from clock generator 8 control the operation of logic circuit 3 and the shift registers. Trains of input pulses are applied on line 10 to logic circuit 3 and are coupled through inverter 11 and line 12 to the first input of AND gate 7.

Figure 3:
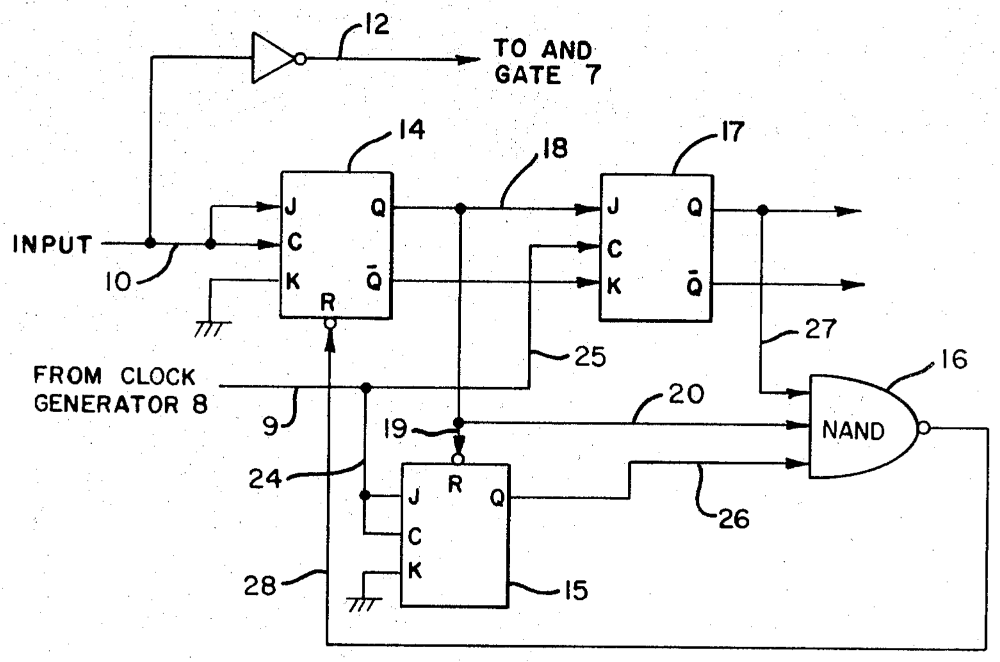
FIG. 3 is a detailed schematic block diagram of the data entry assurance logic circuit of FIG. 2.

DEAL circuit 3 is employed to assure entry of an input pulse into the first stage of the first shift register 4. Referring now to FIG. 3, circuit 3 comprises J–K flip-flops 14 and 15 and NAND gate 16. Input pulses on line 10 are applied to the J and clock (C) inputs of flip-flop 14. The Q and $\overline{Q}$ outputs of flip-flop 14 are coupled to the J and K inputs, respectively, of flip-flop 17 which is the first stage of shift register 4. The Q output of flip-flop 14 is also applied on line 19 to the reset terminal of flip-flop 15 and on line 20 to the first input of NAND gate 16. Clock pulses on line 9 are applied on line 24 to the J and clock (C) inputs of flip-flop 15 and on line 25 to the clock (C) input of flip-flop 17. The Q outputs of flip-flops 15 and 17 are coupled on lines 26 and 27 to the second and third inputs, respectively, of gate 16. The output of gate 16 is coupled on line 28 to the reset terminal of flip-flop 14.

Figure 4:
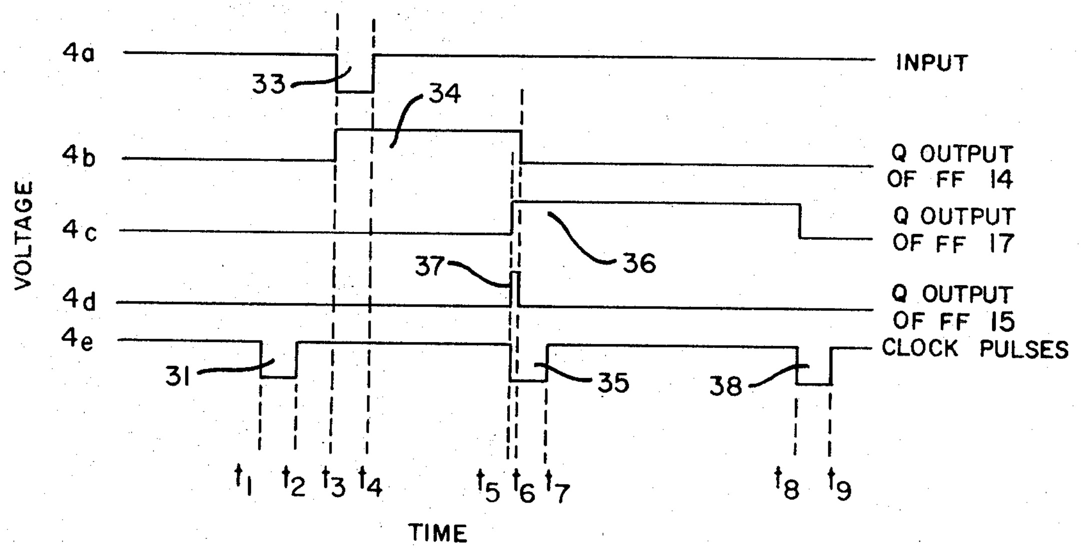
FIG. 4 is waveforms illustrating the operation of the circuit of FIG. 3.

The operation of the DEAL circuit will now be described in relation to the waveforms of FIG. 4 wherein the waveform of FIG. 4*a* represents the input signal on line 10; the waveforms of FIGS. 4*b*, 4*c* and 4*d* represent the Q outputs of flip-flops 14, 17 and 15, respectively; and the waveform of FIG. 4*e* represents clock pulses on line 9.

During quiescent operation prior to receipt of an input pulse, the Q outputs of flip-flop 14 is a zero which holds flip-flops 17 and 15 in the zero state (see FIGS. 4*b*, 4*c* and 4*d*, respectively). When a clock pulse 31 is received at time $t_1$, flip-flop 15 is held in the zero state by the output of flip-flop 14. Gate 16 therefore remains in its initial state producing a logic one output.

When an input pulse 33 is received at time $t_3$ (see FIG. 4*a*), flip-flop 14 switches operating states to produce a positive output 34 (see FIG. 4b) that is applied to and enables flip-flops 15 and 17 and the gate 16. Since the output 34 of flip-flop 14 is positive when clock pulse 35 is received at time $t_5$ (see FIG. 4*e*) flip-flop 17 is caused to change operating states to produce a data pulse 36 (see FIG. 4*c*) which corresponds to receipt of the input pulse 33. It is in this manner that a data pulse is produced in the first stage 17 of shift register 4 for the clock pulse following receipt of an input pulse. Flip-flop 15 is also caused to change operating states at time $t_5$ (see FIG. 4d) by the clock pulse 35 which is applied to the J and clock inputs thereof. Since the input pulses 34, 36 and 37 to NAND gate 16 are all positive at time $t_5$ (see FIGS. 4b, 4c and 4d), the NAND gate is caused to change operating states to produce an output pulse which resets flip-flop 14 at time $t_6$. This change in the operating state and output of flip-flop 14 at time $t_6$ (see FIG. 4b) also causes reset of flip-flop 15 (see FIG. 4d). Flip-flop 17 is reset by the next clock pulse 38 at time $t_8$ (see FIGS. 4c and 4e). The system is now ready for receipt of the next input pulse and entry of an associated data pulse in the first stage 17 of shift register 4.

The output of shift register 4 is applied on line 41 to the second register 5 and on line 42 to the first input to AND gate 6 (see FIG. 2). The output of shift register 5 is applied on line 43 to the second input of gate 6. The output of gate 6 is applied on line 44 to the second input of AND gate 7. The output of gate 7 is the extracted pulse train.

The resettable clock generator 8 comprises an oscillator 46, a down-counter 47, a tunable count-storage register 48 and a plurality of transfer gates 49. Oscillator 46 may be a fixed frequency crystal oscillator having an operating frequency $f_0$. Register 48 stores a count of M which may be varied in order to change the PRF of an input train of pulses to which the system is tuned to respond. Gates 49 are responsive to the output of the down-counter on line 51 for entering the count of M of register 48 into the down-counter. When a pulse train having a PRF substantially equal to the frequency to which the system is tuned to operate is absent from input line 10 so that extracted pulses are absent from line 53, the down-counter 47 produces one clock pulse on line 9 for every M pulse received on line 52 from oscillator 46. Stated differently, counter 47 produces a clock pulse on line 9 when the down-counter has advanced from M down to 0. When an extracted pulse is received on line 53, however, the transfer gates 49 set the down-counter to halfway, i.e., to the count of $M/2$, regardless of the previous contents of the down-counter. Thus, the time interval between a pair of adjacent clock pulses is caused to be between $M/2$ and $3M/2$ pulses on line 52. It is the operation and causes phase locking of the system as described more fully hereinafter.

Figure 5:
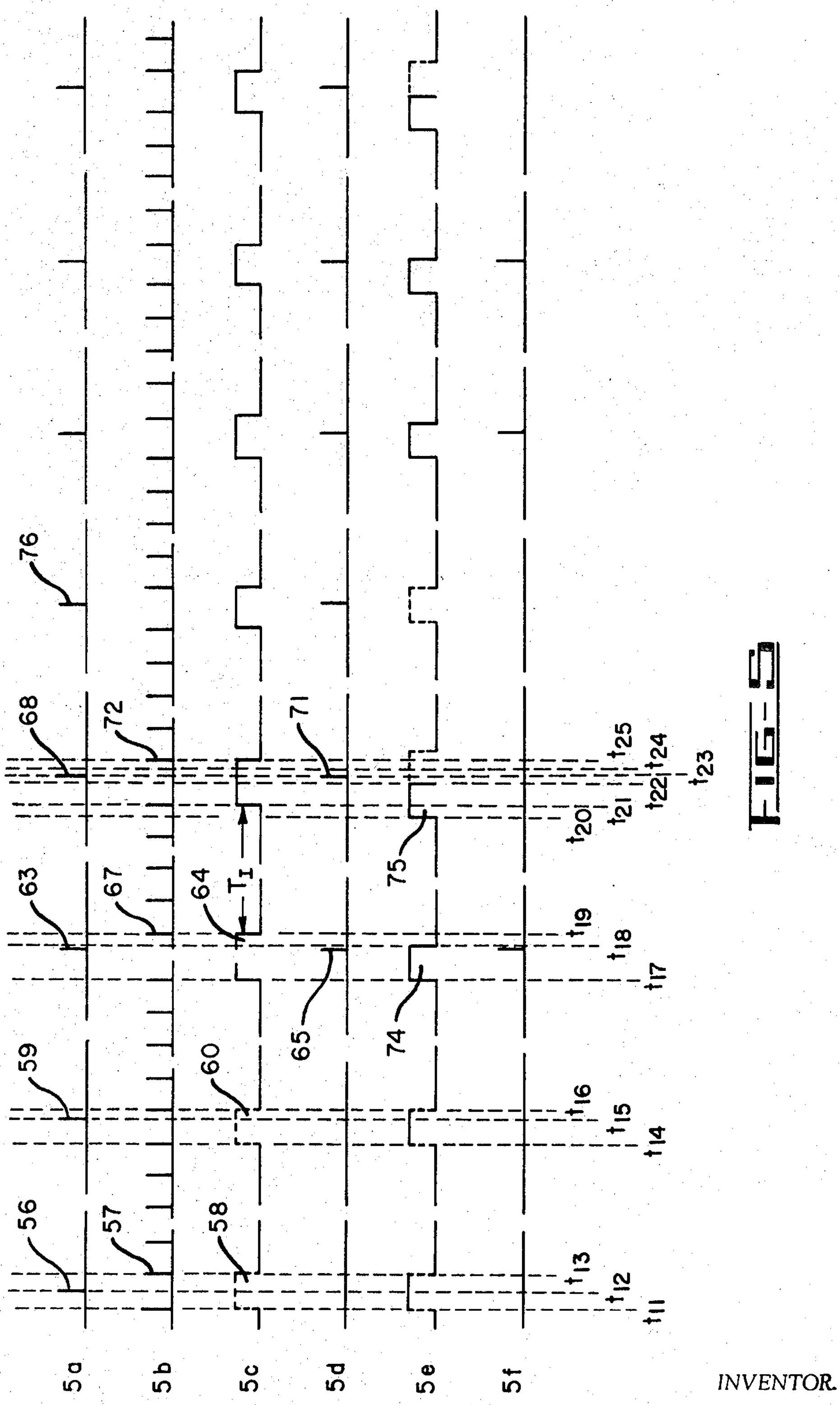
FIG. 5 is waveforms illustrating the operation of the system of FIG. 2.

The operation of the system of FIG. 2 will now be described in relation to the waveforms of FIG. 5 wherein the waveform of FIG. 5a illustrates the timing of input pulses; the waveform of FIG. 5b represents clock pulses on line 9; the waveform of FIG. 5c represents the extraction gate defined by the operation of AND gate 6; the waveform of FIG. 5d represents the output of AND gate 7 which is pulse extracted by the system; the waveform of FIG. 5e represents the extraction gate of the system when the clock generator is not resettable; and, the waveform of FIG. 5f represents extracted pulses for the system in which the clock generator is not resettable.

When the first pulse 56 of a train of input pulses is received at time $t_{12}$ (see FIG. 5a) on line 10 it is applied directly to AND gate 7. Data entry assurance logic circuit 3 also enters the pulse into the first stage of register 4 when the next clock pulse 57 (see FIG. 5b) is generated at time $t_{13}$ as described above. A second pulse is not present at the input of gate 7, however, and the input pulse 56 is not extracted by the system. The extraction gate 58 (see FIG. 5c) is shown in broken lines since it is the theoretical time between adjacent clock pulses during which an input pulse could be extracted.

The first input pulse 56 is advanced through the $n$ stages of register 4 at the clocks frequency $f_c=f_0/M$. Since the PRF of the input pulse train is approximately equal to the frequency $f_c/n=f_0/nM$, at which an input pulse is advanced through one of the registers, the second input pulse 59 (see FIG. 5a) is entered in the first stage of register 4 at time $t_{16}$ when the first pulse 56 is advanced from the $n$th stage of register 4 and entered into the first stage of register 5. Since an output of register 5 is not simultaneously present on line 43 with the output of register 4, AND gate 6 is inoperative. The second pulse 59 is therefore not extracted by gate 7 so that a control signal is absent from line 53. The resettable clock generator 8 therefore continues to operate at its natural frequency $f_0/M$. Extraction gate 60 is also shown in broken lines since an extracted pulse is not generated during this time interval.

Input pulses 56 and 59 are advanced through the associated registers 5 and 4 by the clock pulses on line 9 having the frequency $f_0/M$. The third input pulse 63 (see FIG. 5a) is received immediately prior to the normal time of termination of the third extraction gate 64 at time $t_{18}$ (see FIG. 5c). Since the input pulses 56 and 59 are still present at time $t_{18}$ in the $n$th stages of registers 5 and 4, respectively, AND gates 6 and 7 are both caused to change operating states to produce an extracted pulse 65 on line 66. Transfer gates 49 are responsives to the pulse 65 on line 53 for resetting the down-counter 47 at time $t_{18}$ to halfway or $M/2$. This extends the time of generation of the next clock pulse 67 by one-half of a clock pulse interval to the time $t_{19}$ (see FIG. 5b). This also causes the length of the associated extraction gate 64 (see FIG. 5c) to increase by the same amount si that the length of this extraction gate is approximately one and one-half times its normal length.

When the fourth input pulse 68 is received at time $t_{23}$ (see FIG. 5a), the input pulses 59 and 63 are now in the $n$th stages of registers 5 and 4. Gates 6 and 7 are therefore again both caused to change operating states at time $t_{23}$ to produce another extracted pulse 71 (see FIG. 5d) on line 66. Pulse 71 also causes the down-counter to be set to halfway or $M/2$ to extend the time of generation of the next clock pulse 72 from the time $t_{24}$ to the time $t_{25}$ (see FIG. 5b). This reset of the down-counter occurs each time a pulse is generated on lines 66 and 53 by gate 7 regardless of the count or contents of the down-counter as is seen by reference to the lengths of the extraction gates in FIG. 5c. this operation has the effect of shifting the time or period of occurance of each succeeding extraction gate to encompass the next input pulse and assure extraction thereof. In the example shown or illustrated in the drawings, the PRF of the input pulse train was slightly lower than the frequency $f_0/nM$. It will be noted that the time at which the extraction gate ends is therefore extended by this phase locking. The time interval between the time of the end of one extraction gate and the time of the beginning of the next extraction gate, however, is the same, i.e., the time interval $T_I$ between adjacent extraction gates (see FIG. 5c) is constant. If the PRF of the input pulse train was slightly greater than the frequency $f_0/nM$, the time at which the extraction gate ends would be shortened.

The waveforms of FIGS. 5e and 5f illustrate the operation of an extractor when the clock generator is not resettable. The extraction gates illustrated in FIG. 5e occur at fixed time intervals and are of a fixed length. The term extraction gate as used here is defined as the time interval between a pair of adjacent clock pulses which are generated prior to and immediately following receipt of an input pulse. The extraction gates shown in solid lines in FIG. 5e represent extraction gates which occur when pulses are present in the $n$th stages of registers 4 and 5 and during which extraction of an input pulse may occur. The extraction gates shown in broken lines represent extraction gates which occur when a pulse is present for entry into the first stage of register 4 but are not present in the last stage of either one or both if registers 4 or 5.

The input pulse 63 at time $t_{18}$ (see FIG. 5a) is extracted by the prior art system since it occurs at the end of extraction gate 74 (see FIG. 5*e*). Since the PRF of the input pulses in FIG. 5 is less than the frequency $f_0/nM$, input pulse 68 (see FIG. 5*a*, time $t_{23}$) occurs after the termination of extraction gate 75 at time $t_{22}$ (see FIG. 5*e*). Input pulses 68 and 76 (see FIG. 5*a*) are therefore not extracted by the system. Comparison of FIGS. 5*a*, 5*d* and 5*f* reveals that the prior art system extracts two input pulses and misses the next two input pulses, etc., whereas this invention extracts all of the input pulses once the registers are loaded.

Figure 6:
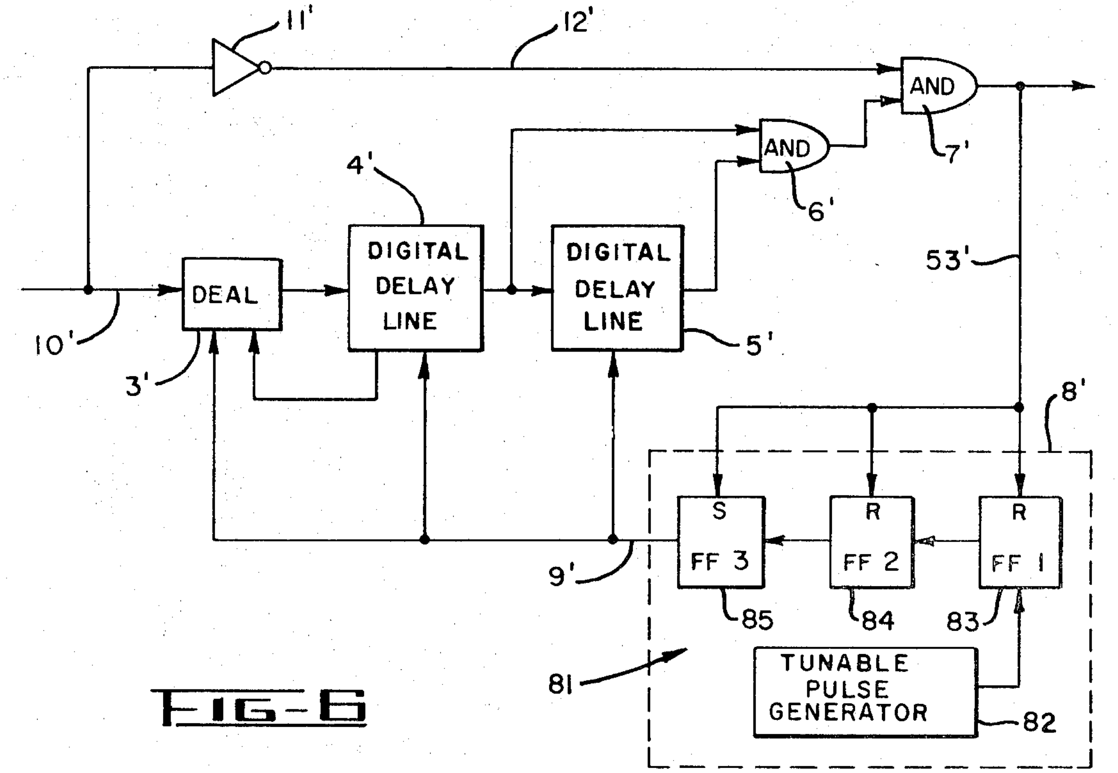
FIG. 6 is a block diagram of a modified form of this invention.

A modified form of the invention employing a simplified resettable clock generator is illustrated in FIG. 6. Primed reference characters in FIG. 6 refer to similar components of FIG. 2. The clock generator 8' comprises a binary counter 81 and a tunable pulse generator 82. The binary counter comprises flip-flops 83, 84 and 85 which are connected to the output of generator 82. The output of AND gate 7' on line 53' is connected to the reset terminals of flip-flops 83 and 84 and to the set terminals of flip-flop 85. Clock pulses are coupled from flip-flop 85 on line 9' to DEAL circuit 3' and shift registers 4' and 5'. The operation of clock generator 8' is illustrated in TABLE 1.

When an extracted pulse is absent from line 53', the binary counter is caused to advance through the eight different states at a rate determined by the frequency of pulse generator 82. Each time the counter completes this cycle of operation, a clock pulse is produced on line 9'. When an extracted pulse is applied on line 53' to the flip-flops, the binary counter is set to halfway by resetting flip-flops 83 and 84 to the zero state and setting flip-flop 85 to the one state as indicated in row 5 of TABLE 1. This operation occurs whenever an extracted pulse is present on line 53' and regardless of the contents presently in the counter.

Figure 7:
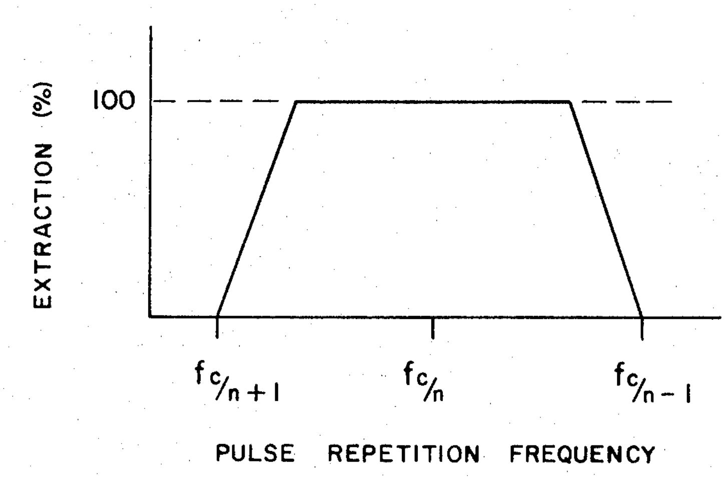
FIG. 7 is a curve illustrating the extraction provided by the system of FIG. 2; and Table 1 illustrates the operation of the resettable clock generator of FIG. 6.

The extraction characteristic of the system of FIG. 2 is represented by the curve in FIG. 7. The extraction characteristic for this system is trapezoidal providing 100% extraction over a band of PRF's symmetrical about the frequency $f_c/n=f_0/nM$. The range over which 100% extraction is provided may be lengthened by increasing the number of stages comprising the counter of the resettable clock generator.

What is claimed is:

1. A system for extracting pulses of an incident pulse train having a particular pulse repetition frequency comprising a resettable clock generator producing clock pulses, a digital delay circuit having a plurality of stages and being responsive to clock pulses and incident pulses for advancing pulses therethrough for producing delayed pulses representative of associated incident pulses, a first logic circuit responsive to incident pulses and delayed pulses for producing an extracted pulse when a delayed pulse associated with an incident pulse and a subsequent incident pulse are simultaneously present, said clock generator being responsive to the extracted pulse for extending the time of generation of the next clock pulse following receipt of said subsequent incident pulse to be a fixed percentage of the clock period measured from the time of generation of the extracted pulse.

2. The system according to claim 1 including a second logic circuit responsive to incident pulses and said clock pulses and producing data pulses representative of receipt of associated incident pulses, said delay circuit being responsive to clock pulses for entering data pulses in the first stage thereof and advancing entered data pulses therethrough for producing delayed data pulses.

3. The system according to claim 2 wherein the delayed data pulse is coupled from the *n*th stage (where *n* is an integer) of said delay circuit and said clock pulses have a clock frequency $f_0/M$ (where M is an integer and $f_0$ is frequency), said delay circuit delaying data pulses for a time interval substantially equal to the period $nM/f_0$ which is substantially equal to an integral multiple of the time interval between adjacent incident pulses having the particular pulse repetition frequency.

4. The system according to claim 3 wherein said clock generator comprises a first oscillator producing pulses having a frequency $f_0$, and a first counter responsive to said first oscillator pulses for producing one clock pulse for every M first oscillator pulses and responsive to an extracted pulse for setting said counter to a predetermined count.

5. The system according to claim 4 wherein said first counter is a binary counter comprising M stages and responsive to an extracted pulse for setting a prescribed number of said stages thereof and resetting the other stages thereof.

6. The system according to claim 5 wherein said first oscillator is tunable for adjusting the system to extract pulses of a pulse train having a different pulse repetition frequency.

7. The system according to claim 3 wherein said clock generator comprises a second oscillator producing a train of pulses having a frequency $f_0$, a second counter responsive to first oscillator pulses for producing one clock pulse for every M first oscillator pulses, a storage circuit storing a count of M, and a transfer gate circuit responsive to an output pulse from said second counter for entering the count of M from said storage circuit into said second counter, and responsive to an extracted pulse for changing the contents of said second counter to be a predetermined count.

8. The system according to claim 7 wherein said storage circuit is tunable for changing the magnitude of the count M therein to adjust the system to extract pulse trains having different pulse repetition frequencies.

9. The system according to claim 7 wherein said predetermined count is $M/2$.

10. In a system for extracting a train of incident pulses comprising a digital delay circuit responsive to pulses from a clock generator for receiving incident pulses and advancing pulses therethrough to produce delayed pulses and a logic circuit responsive to delayed pulses and incident pulses for producing an extracted pulse when a delayed pulse associated with an incident pulse and a subsequent incident pulse are simultaneously present, the method of phase locking the system to the pulse repetition frequency of incident pulses being extracted comprising the step of extending the time of generation of the clock pulse immediately following generation of the extracted pulse to be a percentage of the time interval between clock pulses.

11. The method according to claim 1 wherein the time of generation of said following clock pulse is extended from the time of generation of the extracted pulse by a percentage of the period $1/f_c$ of the clock frequency $f_c$.

References Cited

UNITED STATES PATENTS 3,238,462 3/1966 Ballard et al. -------- 328—63

JOHN S. HEYMAN, Primary Examiner

U.S. Cl. X.R.

328—63, 119, 138, 139, 140